May 15, 1934.	J. THOMAS	1,958,978
STEAM COOKER
Filed Feb. 4, 1932
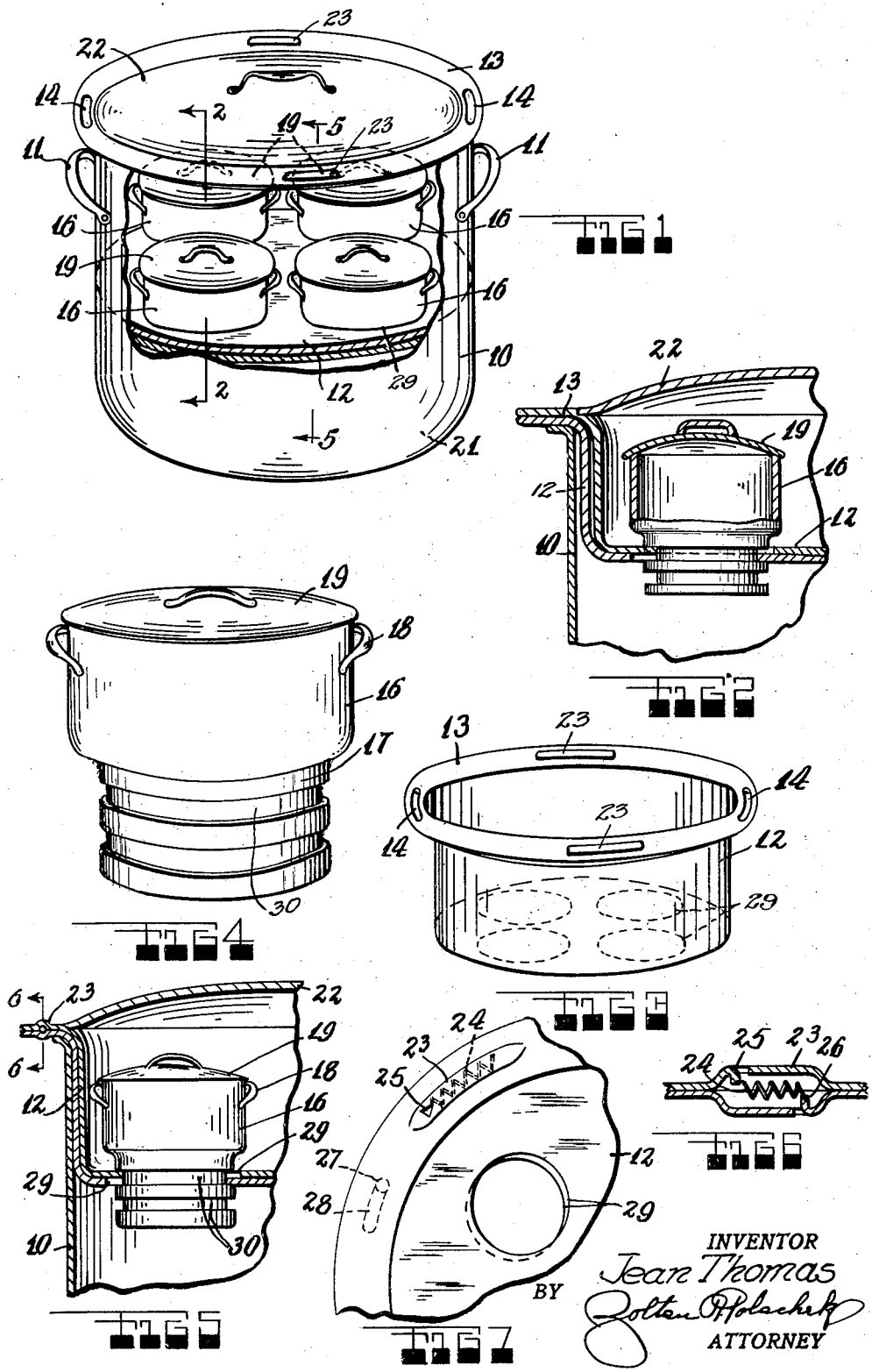

Patented May 15, 1934

1,958,978

UNITED STATES PATENT OFFICE 1,958,978

STEAM COOKER

Jean Thomas, Ridgewood, N. J.

Application February 4, 1932, Serial No. 590,905

3 Claims. (Cl. 53—2)

This invention relates to new and useful improvements in a steam cooker.

The invention has for an object the construction of a steam cooker which is characterized by a pan adapted to engage within a pot and form the plurality of openings for receiving little pots so that water may be put within the large pot and food within the small pots.

The invention has for a still further object the arrangement of a flange upon the pan for resting upon the top of the pot so that the pan may be readily removed.

Furthermore, as another object, it is contemplated to construct the pan of superimposed stacked similar sections and to provide a means for turning these sections slightly away from each other so that the supported small pots are latched in place.

The invention has for a still further object the construction of a device of the class described which is of simple durable construction, dependable in use and efficient in action and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of a steam cooker constructed according to this invention, a portion thereof being broken away to illustrate interior parts.

Fig. 2 is a fragmentary sectional view taken on the line 2—2 of Fig. 1.

Fig. 3 is a perspective view of a pan per se.

Fig. 4 is a perspective view of one of the small pots per se.

Fig. 5 is a view similar to Fig. 2 but on the line 5—5 of Fig. 1.

Fig. 6 is a sectional view taken on the line 6—6 of Fig. 5.

Fig. 7 is a fragmentary elevational view of Fig. 5.

The steam cooker consists of a pot 10 preferably made from one sheet of metal so as to hold water. Handles 11 are attached on the sides thereof. Preferably, these handles should be of aluminum with wooden portions. A pan 12 is provided with a top flange 13 adapted to be engaged within the pot so that the lower portion of the pan extends into the pot and the flange portion rests upon the top edge of the pot. This flange portion is formed with cutouts 14 simulating a handle so that the pan may be easily gripped and removed. The bottom of the pan is formed with a plurality of openings 29 for the reception of small pots.

Several small pots 16 are formed with a reduced bottom 17 so that they may be engaged through the openings 29 and assume a position through the bottom of the pan. Each of the pots 16 has handles 18 and a cover 19. A cover 22 is for the purpose of engaging over and closing the top of the pan 12.

Various foods can be placed in each of the pots 16 electively and the large pot 10 be engaged upon a burner so that the foods may be cooked. Water should be placed within the large pot 10 at a level so as to be below the bottom of the pan 12. When this water becomes evaporated it should be replenished.

The pan 12 is formed from similar inter-engaged pan sections. At the flange portions, these sections have bulged areas 23 in which springs 24 are disposed. Each of the springs has one of its ends attached upon a tongue 25 stamped from one of the flange sections and the other end attached upon a tongue 26 stamped from the other flange section. These springs 24 tend to turn the sections in one direction as limited by a peg 27 projecting from one of the flange sections and engaging through a slot 28 in the other sections. The bottom portions of the sections composing the pan 12 have superimposed openings 29 through which the lower end of pots 16 may be inserted. The springs 24 tend to turn the sections of the pan so that the openings 29 from the pan sections are slightly out of line with each other to tend to grip against the sides of pots engaged therein. To co-operate with the gripping action, each of the pots 16 is formed with a plurality of peripheral recesses 30 at different elevations. The arrangement permits the pot 16 to be supported at various elevations so that it may be set with certain of them engaging into the water and others above the water. To remove any of the pots it is merely necessary to turn the pan sections slightly against the action of the springs 24 so that the openings 29 align with each other.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A steam cooker, comprising a pot, a pan within the pot and comprising identical pan sections set one into the other and having outturned top edges; supported on the top edge of said pot and having registering openings in the bottom, little pots supported in said openings, a large cover for extending across the top of the pan but of a size so as not to cover said outturned top edge completely, and means on said pan for holding said little pots in various vertical positions comprising resilient means urging said pan sections into positions wherein said registering openings are in offset position whereby the sections grip the sides of the pots and are movable from the outturned edges thereof.

2. A steam cooker, comprising a pot, a pan within the pot and comprising identical pan sections set one into the other and having outturned top edges; supported on the top edge of said pot and having registering openings in the bottom, little pots supported in said openings, a large cover for extending across the top of the pan and of a size to only partially cover said outturned top edge completely, and means on said pan for holding said little pots in various vertical positions, comprising resilient means urging said pan sections into positions wherein said registering openings are in offset positions whereby the sections grip the sides of the pots and are removable from the outturned edges thereof, portions of said outturned top edges of said pan sections being bulged away from each other, and said resilient means being disposed within the hollow of said bulged portions and acting between said pan sections.

3. A steam cooker, comprising a pot, a pan within the pot and comprising identical pan sections set one into the other and having outturned top edges supported on the top edge of said pot and having registering openings in the bottom, little pots supported in said openings, a large cover for extending across the pan but of a size so as not to cover said outturned top edge completely, and means on said pan for holding said little pots in various vertical positions, comprising resilient means urging said pan sections into positions wherein said registering openings are in offset positions whereby the sections grip the side of the pots and are removable from the outturned edges thereof, and means for limiting relative motion of said pan sections.

JEAN THOMAS.